Patented Feb. 7, 1933

1,896,282

UNITED STATES PATENT OFFICE

HANS BROCHE AND HELMUTH SCHMITZ, OF ESSEN, GERMANY

PROCESS FOR THE PRODUCTION OF HYDROGENATED NAPHTHALENES FROM TECHNICAL NAPHTHALENE

No Drawing. Application filed June 24, 1930, Serial No. 463,563, and in Germany June 27, 1929.

The catalytic hydrogenation of naphthalene under the most varied conditions as regards the time, temperature and pressure of the reaction has been long known through the work of W. Ipatiew, R. Willstätter and others.

The hydrogenation of naphthalene disclosed by this known work could, however, not acquire technical importance since the known hydrogenation catalysts, which come into question, were poisoned in the shortest time by the impurities present in technical naphthalene or in naphthalene which has been only slightly purified, more particularly by the sulphur compounds. Of course, economy in such a process is not to be obtained by continuously replacing the poisoned catalyst by new catalysts nor by periodically regenerating the catalyst.

It follows that methods had first of all to be devised with the aid of which the technical naphthalene was purified to such an extent that, owing to the purity of the naphthalene now obtained, the economical production of hydrogenated naphthalenes was now possible with the hydrogenating catalysts in spite of the fact that the latter are readily poisoned.

This sharp purification of the naphthalene before its hydrogenation, e. g. with alkali metals, sodamide and so forth which has hitherto been necessary, entails high costs however and puts considerable charges on the production of tetraline, as is apparent in the still very high price of hydrogenated naphthalenes prevailing today.

Consequently up to now technical or only slightly purified varieties of naphthalene did not come into question for the production of hydrogenated naphthalenes, since sufficiently resistant catalysts were not known. But only by the use of such technical varieties of naphthalene, or varieties which have been preliminarily purified to a moderate extent, i. e. correspondingly cheaper varieties of naphthalene, can the production costs of hydrogenated naphthalenes be lowered.

It has now been found that also less carefully purified naphthalenes, such as some naphthalenes of commerce purified with sulphuric acid and distilled, may be hydrogenated with great economical effect using the usual catalysts if the catalyst, e. g. nickel oxide, is precipitated on silica gel. It is true the use of catalyst supports in the hydrogenation of naphthalene has already been known for a long time, but the activity of the catalysts hitherto proposed, as experiments have shown, remains far behind the results produced with silica gel. Thus the use of lumps of clay, kieselguhr, fuller's earth and so forth has frequently been mentioned. But the action of these can in no way be compared with that of silica gel. As prolonged series of experiments have shown, in the hydrogenation of naphthalene purified with sulphuric acid and sharply fractionated, one and the same nickel catalyst precipitated on lumps of clay, kieselguhr, clarite, floridin, tonsil, pumice, magnesite and so forth, may be used in general only two or three times and never above eight times. With more frequent use it loses its activity completely.

If these carriers are replaced by silica gel, then, four times, five times or even many times the effect is produced forthwith. It is then possible to use the hydrogenating catalyst precipitated on silica gel up to twenty-seven times and more without the catalyst showing signs of becoming spent.

The superior action of silica gel as carrier substance for hydrogenations of only slightly purified naphthalene is apparent from the following table. In this table the number of hydrogenations of slightly purified naphthalene to tetraline is stated which can be effected with one and the same catalyst on these carrier materials.

| | |
|---|---|
| 20% NiO on silica gel | more than 27 |
| 20% NiO on lumps of clay | 2 |
| 20% NiO on clarite | 2 |
| 20% NiO on floridin | 7 |
| 20% NiO on tonsil | 8 |
| 20% NiO on pumice | 0 |
| 50% NiO on kieselguhr | 3 |
| 20% NiO on magnesite | 6 |
| 20% NiO on precipitated and calcined silicic acid | 4 |

It is uncertain whether this surprisingly superior effect of a hydrogenating catalyst precipitated on silica gel during the hydrogenation of naphthalene depends on the great surface of the carrier, or whether the specific nature from the chemical point of view is decisive, or whether other factors are determinative. In any case the important fact is apparent that the hydrogenation catalysts known per se, hitherto practically non-usable for the hydrogenation of slightly purified naphthalenes whether they are used alone or precipitated on the carrier substances hitherto proposed, only enable technical or slightly purified naphthalenes to be hydrogenated with economical effect if they are precipitated on silica gel as a support.

The advantages of this process are obvious, and they are more particularly characterized by the fact that with the catalyst combination, according to the invention, moderately purified technical naphthalenes may be converted into hydrogenated naphthalenes with high technical and economical effect with the avoidance of further costly purification processes.

*Example.*—10 kg. of naphthalene, purified e. g. with 3% sulphuric acid (about 90%) and sharply distilled under reduced pressure (20–30 mm. Hg.), or hot pressed material, are treated after addition of 1 kg. of catalyst (e. g. 20% of nickel oxide on silica gel) at an initial hydrogen pressure of 100 atms. for 3 hours at 325°. If the reaction is interrupted after this time, the naphthalene has been converted into almost theoretical yields of tetrahydronaphthalene; on the other hand if the hydrogenation process is allowed to proceed further, then, by a slower reaction, the previously formed tetrahydronaphthalene is converted into decahydronaphthalene. The used catalyst may be regenerated without further preliminary by washing, e. g. with ether, and subsequently igniting in the air and so forth, and may be used for fresh hydrogenations; after being used twenty-seven times it shows no signs of being spent.

The crude tetrahydronaphthalene obtained, of slight yellowish colour, may be obtained as colourless waterclear liquid of boiling point 204 to 207° by a single distillation.

What we claim is:

A process for the production of hydrogenated naphthalenes consisting in reducing moderately purified technical naphthalene, with hydrogen at raised temperature and pressure in presence of a known hydrogenation catalyst supported on silica gel as a carrier substance, as set forth.

In testimony whereof we have signed our names to this specification.

HANS BROCHE.
HELMUTH SCHMITZ.